United States Patent
Franzini et al.

(10) Patent No.: US 11,981,456 B2
(45) Date of Patent: May 14, 2024

(54) DIRECT AND INDIRECT METHODS FOR AIRCRAFT BRAKE WEAR ESTIMATION

(71) Applicant: Goodrich Corporation, Charlotte, NC (US)

(72) Inventors: Giovanni Franzini, Cork City (IE); Matthew R. Pearson, Hartford, CT (US); Konda Reddy Chevva, Ellington, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 616 days.

(21) Appl. No.: 17/157,499

(22) Filed: Jan. 25, 2021

(65) Prior Publication Data

US 2021/0237907 A1 Aug. 5, 2021

(30) Foreign Application Priority Data

Feb. 5, 2020 (EP) ...................................... 20155666

(51) Int. Cl.
*B64F 5/60* (2017.01)
*B60T 17/22* (2006.01)
(Continued)

(52) U.S. Cl.
CPC .............. *B64F 5/60* (2017.01); *B60T 17/221* (2013.01); *B64D 43/00* (2013.01); *F16D 66/026* (2013.01);
(Continued)

(58) Field of Classification Search
CPC ........ B64F 5/60; F16D 66/026; F16D 66/025; F16D 66/027; F16D 2066/001;
(Continued)

(56) References Cited

U.S. PATENT DOCUMENTS

| | | |
|---|---|---|
| 7,244,003 B2 | 7/2007 | Larson et al. |
| 7,416,059 B2 | 8/2008 | Devlieg |

(Continued)

FOREIGN PATENT DOCUMENTS

JP 2007253878 10/2007

OTHER PUBLICATIONS

Translation of Japanese Patent No. JP 2007253878 obtained from website: https://worldwide.espacenet.com on Sep. 5, 2023.*

(Continued)

*Primary Examiner* — Pamela Rodriguez
(74) *Attorney, Agent, or Firm* — SNELL & WILMER L.L.P.

(57) ABSTRACT

A method for estimating the brake wear of a brake installed in a vehicle is described herein, comprising acquiring an initial mass of the brake; quantifying the amount of energy that is being dissipated by the brake over a first time period, measuring a temperature increase of the brake over the first time period; estimating the brake mass based on the amount of dissipated energy and the temperature increase; and comparing the initial mass of the brake with the estimated brake mass and estimating the brake wear based on this comparison. The method for brake wear estimation may use indirect or direct methods for quantifying the amount of energy that is dissipated. A system for estimating brake wear and performing this method is also described.

18 Claims, 1 Drawing Sheet

(51) Int. Cl.
*B64C 25/42* (2006.01)
*B64D 43/00* (2006.01)
*F16D 66/00* (2006.01)
*F16D 66/02* (2006.01)

(52) U.S. Cl.
CPC ........ *B64C 25/42* (2013.01); *F16D 2066/001* (2013.01); *F16D 2066/006* (2013.01)

(58) Field of Classification Search
CPC ... F16D 2066/006; B64D 43/00; B64D 25/42; B60T 17/221
See application file for complete search history.

(56) References Cited

U.S. PATENT DOCUMENTS

| | | | |
|---|---|---|---|
| 7,694,555 B2 | 4/2010 | Howell et al. | |
| 8,152,246 B2 | 4/2012 | Miller et al. | |
| 9,416,835 B2 | 8/2016 | Antanaitis et al. | |
| 10,486,674 B2 | 11/2019 | Robere et al. | |
| 10,495,169 B2 | 12/2019 | Antanaitis et al. | |
| 2018/0290639 A1* | 10/2018 | Dirgo | B60T 17/22 |
| 2018/0297573 A1 | 10/2018 | Alam et al. | |
| 2019/0017561 A1 | 1/2019 | Antanaitis et al. | |
| 2019/0084548 A1 | 3/2019 | Ohazulike | |
| 2019/0107163 A1 | 4/2019 | Medinei et al. | |
| 2019/0263375 A1 | 8/2019 | Oza et al. | |
| 2021/0300313 A1* | 9/2021 | Robertson | F16D 66/00 |

OTHER PUBLICATIONS

EPO, European Search Report dated Jul. 30, 2020 in EP Application No. 20155666.9.

Root, Rob "Brake Energy Considerations in Flight Operations;" Flight Operations Engineering Boeing Commercial Airplanes. Sep. 2003; https://www.smartcockpit.com/docs/Brake_Energy_Consideration_In_Flight_Operation.pdf; retrieved Jul. 29, 2020.

* cited by examiner

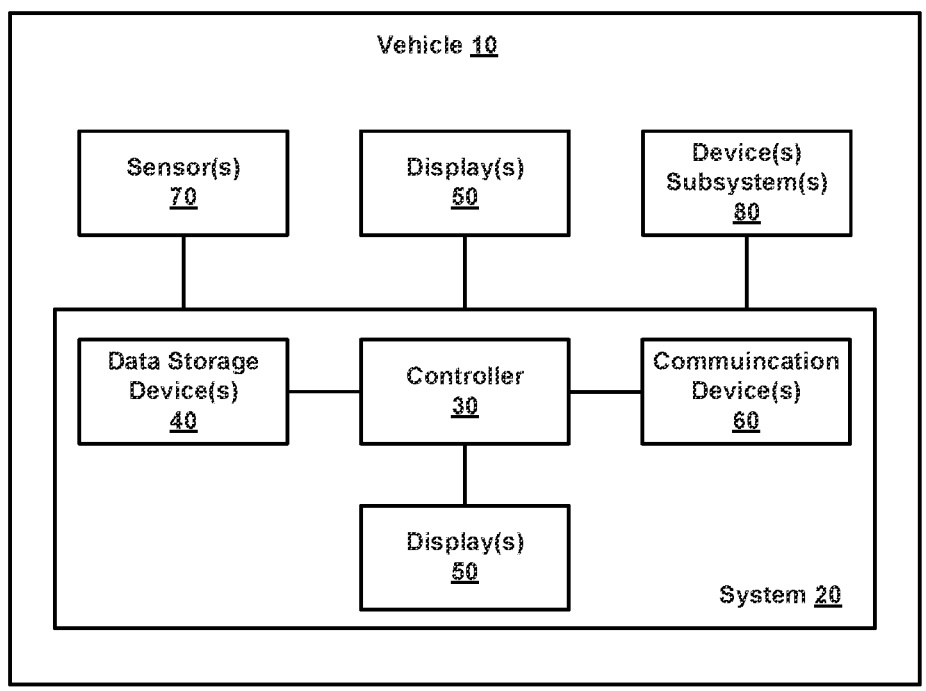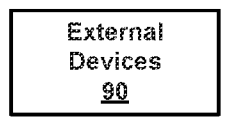

DIRECT AND INDIRECT METHODS FOR AIRCRAFT BRAKE WEAR ESTIMATION

CROSS-REFERENCE TO RELATED APPLICATIONS

This application is a non-provisional of, and claims priority to, and the benefit of European Application No. 20155666.9, entitled "DIRECT AND INDIRECT METHODS FOR AIRCRAFT BRAKE WEAR ESTIMATION," filed on Feb. 5, 2020, which is hereby incorporated by reference in its entirety.

FIELD

The present disclosure relates to systems and methods for more accurately estimating and quantifying brake wear. The system and method may be used in the field of aircraft, as well as other vehicular technologies.

BACKGROUND

Monitoring brake wear in a vehicle is important to keep these critical components fully functional at all times. Traditionally, for aircraft, brake wear monitoring is performed by visual inspection and physical measurement of the wear-pin length. This has drawbacks in that it can only be performed during maintenance by specialized engineers.

U.S. Pat. No. 8,152,246 B2 describes brake conditioning monitoring systems and methods. The system comprises means for detecting actuation of the brakes and means for making a separate record of each actuation of the brakes in which there is relative movement of the facing friction surfaces which cause wear. From that separate record, brake usage is determined. U.S. Pat. No. 7,416,059 B2 describes a system and method for monitoring the wear of one or more aircraft parts such as an aircraft brake, an aircraft tire, a standby system or landing gear. The system comprises at least one sensor for sensing brake temperature, generating a brake temperature signal indicating brake temperature, and determining an estimate of usage of the brake based on the brake temperature signal and estimating a degree to which each individual brake application contributes to wear based on the temperature signal. U.S. Pat. No. 10,495,169 B2 describes a method for determining thickness of a brake motor using the brake rotor temperature. US 20190107163 A1 describes determining the thickness of a vehicle brake pad. The method includes computing a corner power for the brake based on the corner torque and computing a rotor temperature of a rotor of the brake based on the corner power. The brake pad wear rate per unit of power is determined based on the rotor temperature and the corner power. U.S. Pat. No. 10,486,674 B2 describes a method for determining thickness of a brake pad based on the total braking energy of a vehicle and the work done by the brake pads. US 20180297573 A1 describes a method for monitoring the health of a vehicle by calculating the ratio of the input energy to output energy during braking. The output energy may be measured by measuring the increase in temperature of the actual brake force over time during brake application. U.S. Pat. No. 9,416,835 B2 describes a method of estimating brake pad wear by determining required braking energy to be dissipated by a braking system as a fraction of the total kinetic energy according to an energy partitioning model. U.S. Pat. No. 7,694,555 B2 describes a method for providing an estimate of brake pad thickness using sensors. U.S. Pat. No. 7,244,003 B2 describes an apparatus for estimating brake lining wear and lining temperature for a plurality of brake units installed on a vehicle. US20190017561 A1 describes a method for determining the thickness of a vehicle brake rotor.

The methods and systems described herein therefore aim to provide a continuous and accurate estimate of brake wear that can be readily available to pilots, maintenance engineers and vehicle monitoring and control systems at all times.

SUMMARY

According to a first aspect, a method for estimating the brake wear is described herein, comprising acquiring or measuring an initial mass of said brake; quantifying the amount of energy that is being dissipated by the brake over a first time period, measuring a temperature increase of the brake over said first time period; estimating the brake mass based on the amount of dissipated energy and the temperature increase; and comparing said initial mass of said brake with said estimated brake mass and estimating the brake wear based on this comparison.

In some of the examples described herein, said step of quantifying said amount of energy dissipated is indirect.

In some of the examples described herein said step of quantifying said amount of energy dissipated comprises: estimating the total amount of energy dissipated by the vehicle in which the brake is installed, measuring the amount of mechanical work done by the vehicle excluding the brakes; and subtracting said amount of work done from said total energy.

In any of the examples described herein vehicle may be an aircraft and said step of measuring the amount of work done by the aircraft may comprise the total work done by the reverse thrust and the aerodynamic drag of the aircraft.

In some of the examples described herein, said step of quantifying said amount of energy dissipated is direct.

In some of the examples described herein, said amount of energy dissipated may be based on a direct calculation of the energy dissipated by a single brake.

In some of the examples described herein said step of quantifying said amount of energy dissipated may use the measurements of characteristics of the vehicle.

In some of the examples described herein said characteristics may comprise any one or all of the following: applied pressure, rotor angular velocity and physical characteristics of the brake.

A system for estimating the brake wear of a brake installed in a vehicle is also described herein. The system may be configured to perform the method steps.

In some examples the system comprises means configured to acquire or measure an initial mass of said brake; means configured to quantify the amount of energy that is being dissipated by the brake over a first time period; means configured to measure a temperature increase of the brake over said first time period; means configured to estimate the brake mass based on the amount of dissipated energy and the temperature increase; and means configured to compare said initial mass of said brake with said estimated brake mass and estimating the brake wear based on this comparison.

In some of the examples described herein, said step of quantifying said amount of energy dissipated may be indirect and the means configured to quantify said amount of energy dissipated may be further configured to do so by estimating a total amount of energy dissipated by the vehicle in which the brake is installed, measuring the amount of mechanical work done by the vehicle excluding the brakes and subtracting said amount of work done from said total energy.

In any of the examples described herein the vehicle may be an aircraft and the means for measuring the amount of work done by the aircraft does so by adding the total work done by the reverse thrust to the aerodynamic drag of the aircraft.

In some of the examples described herein, the means for quantifying said amount of energy dissipated may be configured to quantify said amount of energy dissipated based on a direct calculation of the energy dissipated by a single brake.

In some of the examples described herein said means for quantifying said amount of energy dissipated may be configured to use measurements of characteristics of the vehicle.

In some of the examples described herein the characteristics may comprise any one or all of applied pressure, rotor angular velocity, physical characteristics of the brake.

BRIEF DESCRIPTION OF DRAWINGS

The accompanying drawings, wherein like numerals depict like elements, illustrate exemplary embodiments of the present disclosure, and together with the description, serve to explain the principles of the disclosure. In the drawings:

FIG. 1 illustrates a block diagram of an exemplary automated shade control system, in accordance with various embodiments.

DETAILED DESCRIPTION

As described above, traditional brake wear monitoring methods have drawbacks in that they can only be performed by specialised engineers during maintenance. The new methods and systems described herein provide an improvement of known methods as they are able to provide an estimate of the brake wear at any time. This has a significant impact on the development of new products aiming at increasing brake life.

In the examples described herein, an index for brake wear can be used for developing control algorithms for wear minimization. This new type of brake wear estimation and quantification can also improve maintenance planning given the possibility of predicting when the brakes must be replaced and, thus, determining when and where the replacement should be available. Furthermore, an indication of the brake status would be always available to the pilots, improving their awareness of the aircraft status.

Certain embodiments of the present disclosure will now be described in greater detail by way of example only.

The new systems and methods are now described in detail. There are two methods described herein: a) indirect and b) direct. Both the methods, however, quantify the energy dissipated by the brakes and then use this information with the measured temperature increase to estimate the brake mass. The latter can then be compared against the original mass in order to estimate the brake wear.

In a first method the quantification of the energy dissipated by the brakes of the vehicle is indirect. Firstly, the initial mass of the brake is acquired. This initial value of the mass can be acquired in various ways, e.g. by being directly measured, given as in input to the algorithm, or read from a memory device. The amount of energy that is being dissipated by the brake is then quantified over a first time period by subtracting the mechanical work done by the reverse thrust and the aerodynamic drag from the total energy. In other words, the total energy dissipated by the aircraft during the braking application is estimated and then the energy dissipated by the brakes is quantified by subtracting from the total energy the mechanical work done by the reverse thrust and the aerodynamic drag. The temperature increase of the brake is measured over the first time period. The brake mass is then estimated based on the amount of dissipated energy and the temperature increase. Finally, the initial mass of the brake is compared with the estimated brake mass and the brake wear is estimated based on this comparison.

For this indirect method for brake wear estimation, the time interval during which the brake application occurred may be defined as $[t_1, t_2]$. The method is then composed by the following steps:

1) Compute the total aircraft braking energy $E_{a/c}$ dissipated during the time interval.
2) Compute the braking energy dissipated by all the N brakes $E_b$, by subtracting the energy dissipated by the reverse thruster $Et$ and by the aerodynamic drag $E_d$ to $E_{a/c}$.
3) Compute the energy dissipated on the i-th brake as $E_{b,i}=a_i E_b/N$, where $a_i$ is a coefficient that takes into account how much the i-th brakes was used with respect to the others in the time interval considered.
4) Compute the new mass of the i-th brake as $m_i(t_2)=E_{b,i}/(\Delta T_i c_b)$ where $\Delta T=T_i(t_2)-T_i(t_1)$ is the temperature change at the end of the brake application, $c_b$ is the brake specific heat capacity.
5) Compute the break wear as $BW_i=1-m_i(t_2)/m_{i,0}$ where $m_{i,0}$ is the original brake mass.

The total aircraft braking energy can then be computed as:

$$E_{a/c} = \frac{1}{2}M\Delta v^2 + \frac{1}{2}\sum_{i=1}^{N_w} I_{w,i}\Delta\omega_i^2 + M_a g \Delta z$$

$$\Delta v = v(t_2) - v(t_1), \Delta\omega_i = \omega_i(t_2) - \omega_i(t_1), \Delta z = z(t_2) - z(t_1)$$

where M is the aircraft mass, v its ground speed, $N_w$ the number of rotating wheels, $I_{w,i}$ and $\omega_i$ the moment of inertia and the angular speed of the i-th wheel, g is the gravitational acceleration, z the aircraft height from the ground.

The equation for $E_{a/c}$ can be simplified by transforming the rotational inertia into translational mass inertia. The wheel angular velocity can be written as $\omega_i = v/R_i$ where $R_i$ is the radius of the i-th wheel. $E_{a/c}$ can then be calculated as follows:

$$E_{\frac{a}{c}} = \frac{1}{2}M\Delta v^2 + \frac{1}{2}\sum_{i=1}^{N_w}\frac{I_{w,i}}{R_i^2}\Delta v^2 + Mg\Delta z = \frac{1}{2}Mk\Delta v^2 + Mg\Delta z,$$

$$k = 1 + \frac{1}{M}\sum_{i=1}^{N_w}\frac{I_{w,i}}{R_i^2}$$

with k denoting the coefficient of added mass, as described in "N. E. Daidzic, *Modeling and computation of the maximum braking energy speed for transport category aiplanes*, Journal of Aviation Technology and Engineering, vol. 6, issue no. 2, 2017, pp. 2-25".

The energy dissipated by the reverse thrust can be calculated as $$E_{rt} = \int_{x(t_1)}^{x(t_2)} F_{rt}(x)dx = \int_{t_1}^{t_2} F_{rt}(\tau)v(\tau)d\tau$$

where $F_{rt}(t)$ is the reverse thrust at time t.

Similarly the energy dissipated by the aerodynamic drag can be computed as $$E_d = \int_{x(t_1)}^{x(t_2)} F_d(x)dx = \int_{t_1}^{t_2} F_d(\tau)v(\tau)d\tau, F_d(t) = \frac{1}{2}AC_d\rho(z(t))v(t)^2$$

where A is the aircraft transversal reference area, $C_d$ is the aircraft drag coefficient, and $\rho(z)$ is the air density at height z.

The brake usage coefficient $\alpha_i$ can be computed by considering a variable indicative of the single brake use during the time interval considered, such as the applied brake pressure:

$$\alpha_i = \frac{\int_{t_1}^{t_2} p_i(\tau)d\tau}{\sum_{j=1}^{N} \int_{t_1}^{t_2} p_j(t)d\tau}$$

For the direct method of brake wear estimation, the method is instead based on the direct calculation of the energy dissipated by the single brake, estimated using the measurements of the applied pressure and of the rotor angular velocity combined with the knowledge of the physical characteristics of the brake.

Consider again the time interval [$t_1$, $t_2$] during which the brake application occurred. The direct method is composed by the following steps:

1) Compute the energy dissipated by the i-th brake as $$E_{b,i} = \int_{\theta_i(t_1)}^{\theta_i(t_2)} F_{b,i}(\theta)d\theta = \int_{t_1}^{t_2} F_{b,i}(\tau)\overline{R}_i\omega_i(\tau)d\tau, F_{b,i}(t) = \mu_i P_i(t)A_i$$

where $\omega_i(\tau)$ and $\overline{R}_i$ are the angular velocity at time t and the average radius of the rotor, and $F_{b,i}(t)$ is the sliding friction force between the stators and rotors at time t, with $\mu_i$ denoting the sliding friction coefficient, $P_i(t)$ the applied pressure at time t, and $A_i$ the total sliding contact area between all rotors and stators.

2) Compute the new mass of the i-th brake as $m_i(t_2)=E_{b,i}/(\Delta T_i c_b)$ where $\Delta T_i=T_i(t_2)-T_i(t_1)$ is the temperature change at the end of the brake application, and $c_b$ is the brake specific heat capacity.

3) Compute the break wear as $BW_i=1-m_i(t_2)/m_{i,0}$ where $m_{i,0}$ is the original brake mass.

A system may also be provided that is able to perform this method. For example, the system may comprise a computer or controller that is adapted to perform these method steps. The system may comprise a controller that is able to receive inputs from various sensors on the vehicle and use those inputs in order to perform the method steps described above. In an aircraft, such controller may be the same controller that is responsible for brake actuation or alternatively may be a dedicated controller connected or integrated with the avionics systems.

A schematic of a vehicle that may incorporate a system to execute any of the methods described herein is illustrated in FIG. 1 and is identified by reference numeral 10. The vehicle 10 includes a system 20, which in turn includes a computer or controller 30 and one or more data storage device 40 (e.g., non-volatile memory; a computer-readable storage medium; of any appropriate data storage type/architecture). The system 20 may also utilize one or more displays 50 (disposed at any appropriate location or combination of locations, including a where the vehicle 10 itself includes one or more of the displays 50), one or more communication devices 60 of any appropriate type (e.g. wireless), or both. The controller 30 may include/utilize one or more processors and any appropriate processing architecture (e.g., configured to execute any of the methods described herein). Input to the controller 30 (e.g., for determining brake wear) may be through one or more sensors 70 of the vehicle 10 that are operatively interconnected with controller 30 in any appropriate manner. Information about brake wear (determined by the controller 30) may be logged in the data storage device (s) 40 (e.g., the controller 30 may be operatively interconnected with the data storage device(s) 40 in any appropriate manner). The system 20 may be configured to allow the communication device(s) 60 (of any appropriate and using any appropriate communications link) to send brake wear status information and/or information logged in the data storage device (s) 40 to one or more devices and/or subsystems 80 of the vehicle 10, to one or more external devices 90 ("off-board" relative to the vehicle 10), or both. The system 20 could also be separate from the vehicle 10, but configured to receive the relevant inputs (e.g., through an input device operatively connected/connectable with the controller 30) for purposes of allowing the controller 30 to execute any of the methods described herein.

The system may comprise a display for the user/pilots, where information about the brake wear status coming from the controller are shown.

The system may comprise a non-volatile data storage device where the information about the brake wear is logged and can be retrieved by the pilots, by maintenance engineers, by brake actuation controllers and by other on-board control and monitoring systems at any time.

In some examples the system may comprise a wireless communication device that is configured to, or able to, send the information about the brake wear status or the information logged in the data storage device both to aircraft internal devices and/or subsystems and to external receiving devices. Such a communication device will enable the possibility for maintenance engineers to remotely retrieve information about the brake wear status and, consequently, plan brake disc substitution in advance.

A schematic of a vehicle that may incorporate a system to execute any of the methods described herein is illustrated in FIG. 1 and is identified by reference numeral 10. The vehicle 10 includes a system 20, which in turn includes a computer or controller 30 and one or more data storage device 40 (e.g., non-volatile memory: a computer-readable storage medium; of any appropriate data storage type/architecture). The system 20 may also utilize one or more displays 50 (disposed at any appropriate location or combination of locations, including where the vehicle 10 itself includes one or more of the displays 50), one or more communication devices 60 of any appropriate type (e.g. wireless), or both. The controller 30 may include/utilize one or more processors and any appropriate processing architecture (e.g., configured to execute any of the methods described herein). Input to the controller 30 (e for determining brake wear) may be through one or more sensors 70 of the vehicle 10 that are operatively interconnected with controller 30 in any appropriate manner. Information about brake wear (determined by the controller 30) may be logged in the data storage device(s) 40 (e.g., the controller 30 may be operatively interconnected with the data storage device(s) 40 in any appropriate manner). The system 20 may be configured to allow the communication device(s) 60 (of any appropriate and using any appropriate communications link) to send brake wear status information and/or information logged in the data storage device (s) 40 to one or more devices and/or subsystems 80 of the vehicle 10, to one or more external devices 90 ("off-board" relative to the vehicle 10), or both. The system 20 could also be separate from the vehicle 10, but configured to receive the relevant inputs (e.g., through an input device operatively connected/connectable with the controller 30) for purposes of allowing the controller 30 to execute any of the methods described herein.

Although the examples described here are in relation to the brake wear of a brake installed in an aircraft, the same system and methods could also be used in any other vehicle and the examples are not limited to an aircraft.

The methods and systems described herein offer advantages over known methods and systems. For example, the wear-pin number of inspections can be reduced, which results in a consequent maintenance cost saving. The methods provide a more efficient maintenance planning: the brake wear status can be retrieved at any time without need of inspection and the information can be used for planning brake discs substitution with benefits on logistic costs. Brake wear information can be made available to the brake control system, enabling wear based control strategies for brake life improvement, Brake wear information can be made available to pilots improving their awareness of the aircraft components status.

What is claimed is:

1. A method for estimating the brake wear of a brake installed in a vehicle, comprising:
   acquiring an initial mass of said brake;
   quantifying the amount of energy that is being dissipated by the brake over a first time period, measuring a temperature increase of the brake over said first time period;
   estimating a brake mass based on the amount of dissipated energy and the temperature increase; and
   comparing said initial mass of said brake with said estimated brake mass and estimating the brake wear based on this comparison.

2. The method of claim 1 wherein said step of quantifying said amount of energy dissipated is indirect.

3. The method of claim 2 wherein said step of quantifying said amount of energy dissipated comprises:
   estimating a total amount of energy dissipated by the vehicle in which the brake is installed,
   measuring the amount of mechanical work done by the vehicle excluding the brakes, and
   subtracting said amount of work done from said total energy.

4. The method of claim 3 wherein said vehicle is an aircraft and wherein said step of measuring the amount of work done by the aircraft comprises the summation of total work done by the reverse thrust and the aerodynamic drag of the aircraft.

5. The method of claim 1 wherein said step of quantifying said amount of energy dissipated is direct.

6. The method of claim 5, wherein said amount of energy dissipated is based on a direct calculation of the energy dissipated by a single brake.

7. The method of claim 5 wherein said step of quantifying said amount of energy dissipated uses the measurements of characteristics of the vehicle.

8. The method of claim 7 wherein said characteristics comprise any one or all of applied pressure, rotor angular velocity and physical characteristics of the brake.

9. A system for estimating the brake wear of a brake installed in a
   vehicle, comprising means configured to acquire an initial mass of said brake;
   means configured to quantify the amount of energy that is being dissipated by the brake over a first time period, means configured to measure a temperature increase of the brake over said first time period;
   means configured to estimate a brake mass based on the amount of dissipated energy and the temperature increase; and
   means configured to compare said initial mass of said brake with said estimated brake mass and estimating the brake wear based on this comparison.

10. The system of claim 9 wherein said step of quantifying said amount of energy dissipated is indirect and wherein said means configured to quantify said amount of energy dissipated is further configured to do so by estimating a total amount of energy dissipated by the vehicle in which the brake is installed, measuring the amount of mechanical work done by the vehicle excluding the brakes and subtracting said amount of work done from said total energy.

11. The system of claim 10 wherein said vehicle is an aircraft and wherein means for measuring the amount of work done by the aircraft does so by adding the total work done by the reverse thrust and the aerodynamic drag of the aircraft.

12. The system of claim 11 wherein said means for quantifying said amount of energy dissipated is configured to use measurements of characteristics of the vehicle.

13. The system of claim 12 wherein said characteristics comprise any one or all of applied pressure, rotor angular velocity, physical characteristics of the brake.

14. The system of claim 9 wherein means for quantifying said amount of energy dissipated is configured to quantify said amount of energy dissipated based on a direct calculation of the energy dissipated by a single brake.

15. The system of claim 9 further comprising a display unit for displaying information about the brake wear coming from a controller.

16. The system of claim 15 further comprising a wireless communication device configured to send information about the brake wear to either or both of aircraft internal devices and/or subsystems and/or to external receiving devices.

17. The system of claim 9 further comprising a non-volatile data storage device for storing information about the brake wear.

18. The system of claim 17 comprising a wireless communication device that is configured to send said information saved in the data storage device to either or both of aircraft internal devices and/or subsystems and/or to external receiving devices.

* * * * *